C. W. NEWTON.
SAW ATTACHMENT.
APPLICATION FILED SEPT. 10, 1909.

976,902.

Patented Nov. 29, 1910.

WITNESSES:
Ernest C. Berry
Mabel Emery

INVENTOR
Charles W. Newton

BY
Hardway & Cachey
ATTORNEY

UNITED STATES PATENT OFFICE.

CHARLES W. NEWTON, OF HOUSTON, TEXAS.

SAW ATTACHMENT.

976,902.

Specification of Letters Patent.

Patented Nov. 29, 1910.

Application filed September 10, 1909. Serial No. 517,117.

*To all whom it may concern:*

Be it known that I, CHARLES W. NEWTON, a citizen of the United States, residing at Houston, in the county of Harris and State of Texas, have invented certain new and useful Improvements in Saw Attachments, of which the following is a specification.

My device relates to new and useful improvements in saw attachments and more particularly to that class of attachments which are used to cut bevels or odd angles in timbers, such as rafters for roofs.

The object of the device is to provide a machine which may be used in the field or place of construction.

Another object is to provide a device of the character described which will cut a piece of timber at any desired angle without the necessity of a change which would require the aid of a tool.

Still another object is to provide a device of the character described which will permit of the feed being at the will of the operator.

With these and other objects in view, attention is drawn to the simplicity and adaptability of the structure, an example of which is shown in the accompanying drawings and explained in this specification, wherein:—

Figure 1:
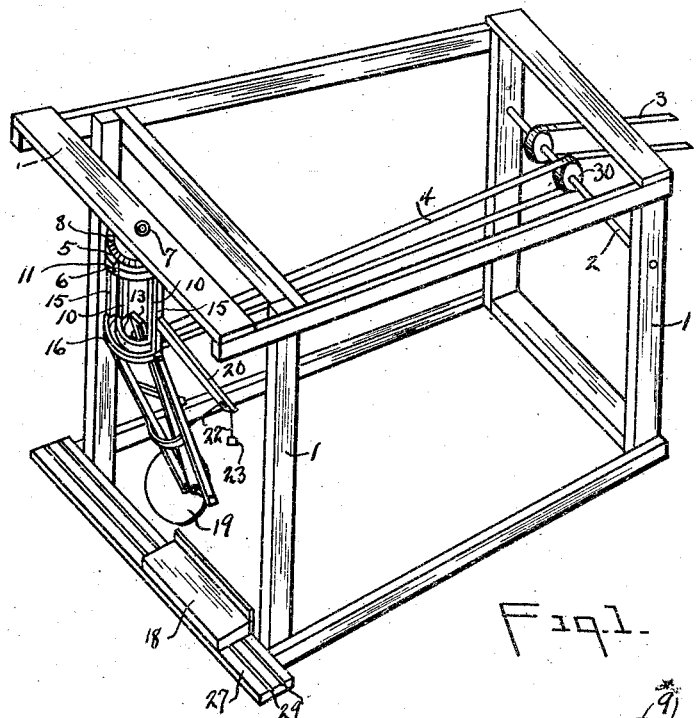
Figure 2:
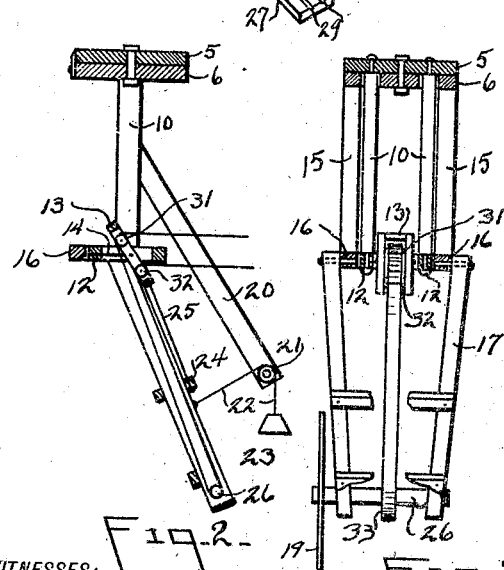
Figure 4:
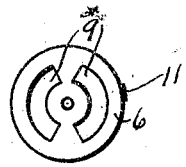
Figure 5:
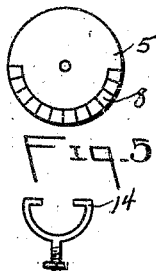
Figure 6:
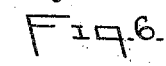
Figure 3:
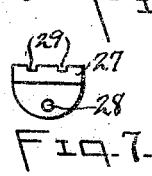
Figure 7:
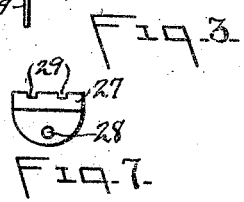

Figure 1 is a perspective view of my complete device. Fig. 2 is a side elevation of the supporting mechanism. Fig. 3 is a front elevation of the same. Fig. 4 is a plan view of the lower turning table. Fig. 5 is a plan view of the upper turning table showing the protractor for setting the machine at the desired angle. Fig. 6 is a plan view of the rotatable means for connecting the upper pulley frame to the supporting frame while Fig. 7 is a side elevation of the table upon which the material to be sawed, is placed.

Referring now more particularly to the drawings wherein like numerals of reference designate similar parts in each of the figures, the numeral 1 refers to the main frame which supports the device.

The numeral 2 refers to the driving shaft to which is attached the belt 3 leading from the motive mechanism. In connection with said shaft, a belt 4 leads to a device hereinafter described.

Attached to the front and center of the main frame is suspended a turning table 5. This table is substantially fixed to the main frame, with a protractor 8 upon the upper surface. Directly beneath table 5 and of the same diameter, a second table 6 is rotatably attached by a bolt or other suitable means 7. The table 6 is provided with slots 9 which permit of the leaders 10 passing therethrough. On the periphery of said table, a hand or indicator 11 is attached with the point extending upward. By this indicator and in connection with the protractor 8, it will be seen that when turning the rotatable table upon its axis, the direction will be indicated by the indicator pointing to the degree marked on the protractor.

To the under side of the upper table 5, two downwardly extending supports 10, are rigidly attached; these supports pass through the slots 9 in the lower table 6 and maintain a rigid connection with an encircling frame 12. The frame 12 covers little more than half a circle and in turn supports, by means of a frame 13 and pivotal supports 14, two guide pulleys 31 and 32. To the lower table 6 and at its lower extremity two downwardly extending supports 15 are rigidly attached. At the lower end of these supports, a brace 16 ties the ends thereof and keeps them from contacting with the inner mechanism hereinbefore described. Hingedly attached to this last mentioned brace, and on the outer extremity, a frame 17 extends downward to a point far enough distant from the feed table 18 to permit a circular saw 19 to turn freely. Through a cross brace 24 upon said frame, a guide 25 extends upward and connects with frame 13 in such a manner as to keep the said frame in a direction and at an angle relative to frame 17 so that in operation it keeps belt 4 from contact in its rotative movement. At the lower extremity of the said frame and upon which the cutter 19 is placed, a shaft 26 is secured and turned by the aforementioned belt 4.

Upon one side of the supports 15, a brace 20 is attached in such a manner as to provide a support, whereupon at its lower extremity, a pulley 21 performs the duty of guide to cable 22. This cable is attached at one end to the frame 17 and at its other to a balance or return weight 23.

Directly beneath the front and center of the device and below the cutter, a guide table 27 extends across the entire front of the main supporting frame 1 and is hingedly attached as shown in Fig. 7 where the pivotal point 28 is shown. Upon this guide table 27 the slidable carriage 18 rests and has upon its under surface longitudinally extending ribs which match and are slidable in the grooves 29.

The belt 4 passes around a pulley 30 upon shaft 2 and is guided over the center by pulleys 31 and 32 thence around a pulley 33 on shaft 26 thus completing the circuit.

It will be seen by the above description and the drawings, when a piece of timber is placed upon the carriage 18 and held under the center that by turning the frame 15 upon its axis 7 to the desired angle, the saw may then be pulled forward by hand thus forcing the blade to pass through the material to be cut. Upon passing through said material and release of the hand, the weight 23 will pull the cutting member 19 and frame 17 backward thus clearing the carriage of the cutting member and warding off any danger of contact with the operator as well as permitting another piece of material to be placed upon said carriage.

What I claim is:

1. In a machine of the character described, a main supporting frame, a member rigidly mounted thereon, a second member pivotally mounted in connection with the aforesaid member, supports suspended from each of the above members and braced at their lower extremities, a hingedly attached frame suspended from said pivotally mounted support and member, a driving means, and a cutting means operated by said driving means located on the hingedly attached frame.

2. In a machine of the character described, a main supporting frame, a circular table rigidly mounted on the front and center thereof, a second circular table pivotally connected to the aforesaid table, downwardly extending supports from each of the aforesaid tables and braced at their lower extremities the inner of said supports carrying a frame within which pulleys are located a cutting means, belts adapted to operate said cutting means through said pulleys and a hingedly attached frame suspended from said pivotally mounted support and table.

3. In a machine of the character described, a main supporting frame with an overhanging extension at the end, a circular table rigidly mounted thereon, a second circular table pivotally mounted in connection with the aforesaid table, slots at a mean distance from the center of said first mentioned table extending partially around the center, downwardly extending supports from each of the above said tables and braced at their lower extremities, a hingedly attached frame suspended from said pivotally mounted support and table, a cutting means, a frame pivotally mounted within the inner suspended table, said frame being located so that its center is directly beneath the center of the circular tables, and a driving means for operating said cutting means in such a manner as to allow the cutting means to move in a changeable direction.

In testimony whereof I have signed my name to this specification in the presence of two subscribing witnesses.

CHARLES W. NEWTON.

Witnesses:
 CHAS. R. MUNGER,
 E. C. GUY.